United States Patent
Coogan et al.

(10) Patent No.: US 11,795,684 B2
(45) Date of Patent: *Oct. 24, 2023

(54) VAPOR RETARDING BUILDING MATERIALS AND METHODS FOR MAKING THEM

(71) Applicant: CertainTeed LLC, Malvern, PA (US)

(72) Inventors: Timothy Jerome Coogan, West Boylston, MA (US); Jeffrey H. Peet, Southborough, MA (US); Valerio Massara, Redavalle (IT); Kenneth D. Knapp, Norristown, PA (US)

(73) Assignee: CERTAINTEED LLC, Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/494,138

(22) Filed: Oct. 5, 2021

(65) Prior Publication Data

US 2022/0098853 A1 Mar. 31, 2022

Related U.S. Application Data

(63) Continuation of application No. 16/022,847, filed on Jun. 29, 2018, now Pat. No. 11,136,755.

(60) Provisional application No. 62/527,609, filed on Jun. 30, 2017.

(51) Int. Cl.

| | |
|---|---|
| C09D 7/63 | (2018.01) |
| C09D 7/40 | (2018.01) |
| C09D 7/65 | (2018.01) |
| C09D 7/61 | (2018.01) |
| B32B 27/00 | (2006.01) |
| B32B 5/26 | (2006.01) |
| B32B 13/04 | (2006.01) |
| B32B 21/02 | (2006.01) |
| B32B 21/13 | (2006.01) |
| B32B 21/14 | (2006.01) |
| B32B 27/08 | (2006.01) |
| B32B 27/32 | (2006.01) |
| B32B 27/34 | (2006.01) |
| B32B 27/36 | (2006.01) |
| B32B 7/12 | (2006.01) |
| E04B 1/62 | (2006.01) |
| C09D 109/08 | (2006.01) |
| C08K 3/34 | (2006.01) |

(52) U.S. Cl.
CPC ............... *E04B 1/625* (2013.01); *C09D 7/63* (2018.01); *C09D 109/08* (2013.01); *B32B 27/00* (2013.01); *C08K 3/346* (2013.01); *C09D 7/40* (2018.01); *C09D 7/65* (2018.01)

(58) Field of Classification Search
None
See application file for complete search history.

(56) References Cited

U.S. PATENT DOCUMENTS

| | | |
|---|---|---|
| 3,879,493 A | 4/1975 | Mudde |
| 4,753,826 A | 6/1988 | Lauman |
| 4,818,600 A | 4/1989 | Braun et al. |
| 5,360,847 A | 11/1994 | Dewacker et al. |
| 5,681,385 A | 10/1997 | Beckenhauer |
| 5,888,714 A | 3/1999 | Bourdelais |
| 5,897,411 A | 4/1999 | Stark et al. |
| 6,150,289 A | 11/2000 | Chen |
| 6,228,920 B1 | 5/2001 | Topolkaraev et al. |
| 6,316,687 B1 | 11/2001 | Davis et al. |
| 6,346,353 B1 | 2/2002 | Wang |
| 6,794,024 B1 | 9/2004 | Walton et al. |
| 6,808,772 B2 | 10/2004 | Kunzel et al. |
| 7,332,450 B2 | 2/2008 | Boylan |

(Continued)

FOREIGN PATENT DOCUMENTS

| | | |
|---|---|---|
| EP | 1010807 A | 6/2000 |
| JP | S646068 A | 1/1989 |

(Continued)

OTHER PUBLICATIONS

JLC-epoxy coating drywall, tapping blueboard. Sep. 7, 2000 https://forums.jlconline.com/forums/forum/jlc-online-expert-forums/drywall-finishes/3998-epoxy-coating-drywall-tapping-blueboard (Year: 2000).
Air Products, Ancarez TM AR555 Waterborne Epoxy—Technical Bulletin (Year: 2010).
Momentive, CoatOSil* 1770 Silane; https://www.momentive.com/en-US/categories/additives-adhesives-sealants/coatosil-1770-silane/ (Year: 2011).

(Continued)

*Primary Examiner* — Sheeba Ahmed
(74) *Attorney, Agent, or Firm* — MCDONNELL BOEHNEN HULBERT & BERGHOFF LLP

(57) ABSTRACT

The present disclosure relates generally to vapor retarding building materials and methods for making them. The present inventors have found simple and cost-efficient materials that have low water vapor permeability at low relative humidities and that can be provided as a coating on a building material substrate. Notably, in many embodiments, the materials can have high water vapor permeability at high relative humidities. In one embodiment, the disclosure provides vapor retarding articles comprising a building material substrate; and a polymeric coating layer coated on the building material substrate, the polymeric coating layer comprising an inorganic hydrophilic particulate filler dispersed in a continuous organic phase comprising a hydrophobic polymer, wherein the content of the filler is from about 30% to about 85% by weight of the polymeric coating layer, the vapor retarding article configured to have a water vapor permeance of no more than about 1 Perm at 25% relative humidity.

19 Claims, 2 Drawing Sheets

(56) References Cited

U.S. PATENT DOCUMENTS

| | | | |
|---|---|---|---|
| 7,442,659 B2 | 10/2008 | Moll | |
| 7,745,357 B2 | 6/2010 | Smith et al. | |
| 7,749,928 B2 | 7/2010 | Smith et al. | |
| 7,851,052 B2 | 12/2010 | Caldwell | |
| 7,932,195 B2 | 4/2011 | Smith et al. | |
| 8,461,067 B2 | 6/2013 | Smith et al. | |
| 11,136,755 B2 * | 10/2021 | Coogan | B32B 27/302 |
| 2002/0111422 A1 | 8/2002 | Back | |
| 2003/0012954 A1 | 1/2003 | Schauer | |
| 2004/0209074 A1 | 10/2004 | Randall et al. | |
| 2005/0000183 A1 | 1/2005 | Fay et al. | |
| 2005/0199391 A1 | 6/2005 | Mason | |
| 2005/0284338 A1 | 12/2005 | Dwyer | |
| 2006/0059852 A1 | 3/2006 | Toas et al. | |
| 2006/0155031 A1 | 7/2006 | Wiercinski | |
| 2006/0178466 A1 | 8/2006 | Kim et al. | |
| 2006/0193995 A1 | 8/2006 | Yong | |
| 2007/0015424 A1 | 1/2007 | Toas et al. | |
| 2007/0283652 A1 | 12/2007 | Chen et al. | |
| 2007/0287019 A1 | 12/2007 | Chen et al. | |
| 2007/0294976 A1 | 12/2007 | Fay | |
| 2008/0050565 A1 | 2/2008 | Gross | |
| 2008/0145681 A1 | 6/2008 | Toas et al. | |
| 2008/0160280 A1 | 7/2008 | Chen et al. | |
| 2008/0176050 A1 * | 7/2008 | Lintz | C04B 26/18 428/317.7 |
| 2008/0311813 A1 | 12/2008 | Ting et al. | |
| 2009/0107080 A1 | 4/2009 | Bowe | |
| 2010/0146887 A1 | 6/2010 | Wiker | |
| 2010/0203790 A1 | 8/2010 | Moulton et al. | |
| 2010/0310893 A1 | 12/2010 | Derbyshire | |
| 2011/0151225 A1 | 6/2011 | Bowe et al. | |
| 2011/0190405 A1 | 8/2011 | Delaviz et al. | |
| 2011/0274856 A1 | 11/2011 | Koenig | |
| 2012/0059098 A1 | 3/2012 | Monden | |
| 2012/0077400 A1 | 3/2012 | Flood et al. | |
| 2012/0135652 A1 | 5/2012 | Dandenault | |
| 2012/0228182 A1 | 9/2012 | Ting et al. | |
| 2012/0231170 A1 * | 9/2012 | Cao | C09D 133/08 524/400 |
| 2012/0301712 A1 | 11/2012 | Bayless | |
| 2012/0328811 A1 | 12/2012 | Patel | |
| 2013/0040158 A1 | 2/2013 | Marakainen | |
| 2013/0260162 A1 | 10/2013 | Fickert et al. | |
| 2013/0295364 A1 | 11/2013 | Saavedra et al. | |
| 2014/0115989 A1 | 5/2014 | Sievers | |
| 2015/0176211 A1 | 6/2015 | Knapp et al. | |
| 2016/0015851 A1 | 1/2016 | Chiou et al. | |
| 2016/0032143 A1 | 2/2016 | Wolbers et al. | |
| 2016/0185994 A1 | 6/2016 | Peet | |
| 2016/0244599 A1 | 8/2016 | Kurokawa | |
| 2016/0263859 A1 | 9/2016 | Rao et al. | |
| 2019/0002707 A1 | 1/2019 | Coogan | |

FOREIGN PATENT DOCUMENTS

| | | |
|---|---|---|
| JP | H03287672 A | 12/1991 |
| JP | H0921096 A | 1/1997 |
| JP | H10158994 A | 6/1998 |
| JP | 2000220094 A | 8/2000 |
| JP | 2000303026 A | 10/2000 |
| JP | 2008019295 A | 1/2008 |
| JP | 2009274287 A | 11/2019 |
| KR | 10-2013-0019653 A | 2/2013 |
| KR | 10-1723600 B1 | 4/2017 |
| WO | 98/51635 A1 | 11/1998 |
| WO | 2005030860 A1 | 4/2005 |
| WO | 2008119887 A1 | 10/2008 |
| WO | 2013164646 A1 | 11/2013 |
| WO | 2015095786 A1 | 6/2015 |
| WO | 2015095805 A1 | 6/2015 |

OTHER PUBLICATIONS

BASF, Technical information: Efka® FA4642. Aug. 2012. (Year: 2012).

3M® Stain Resistant Additive SRC-220 for Use as a Stain Resistant Additive. (Year: 2016).

Watkins et al., Hexion—Formulating High-Performance Waterborne Epoxy Coatings, Apr. 2012. https://www.hexion.com/docs/default-source/eps/formulating-high-performance-waterborne-epoxy-coatings.pdf?sfvrsn=14 (Year: 2012).

Copending U.S. Appl. No. 16/023,595, filed Jun. 29, 2018.

International Search Report and Written Opinion in Int'l Pat. App. PCT/SU2018/040197, dated Nov. 16, 2018.

* cited by examiner

VAPOR RETARDING BUILDING MATERIALS AND METHODS FOR MAKING THEM

CROSS-REFERENCE TO RELATED APPLICATIONS

This application claims the benefit of priority of U.S. Provisional Patent Application No. 62/527,609, filed Jun. 30, 2017, which is hereby incorporated herein by reference in its entirety.

BACKGROUND OF THE DISCLOSURE

1. Field of the Disclosure

The present disclosure relates generally to vapor retarding building materials and methods for making them. More particularly, the present disclosure relates to vapor retarding building materials that have desirable variable water vapor permeability.

2. Technical Background

Building materials can include films or facing materials attached to them to provide desired physical properties. One such desired property is the ability to reduce moisture in the wall cavity. Reducing moisture in the wall cavity can prevent deterioration of the building materials and a reduction in the thermal conductivity within the wall cavity, which can further assist in reduction of energy costs. Currently available products suffer from the ability to maintain desired water vapor permeability at a low or variable relative humidity. Their interior moisture barriers usually provide low permeability across all conditions (i.e., the full range of relative humidity), but do not allow for high permeability during high relative humidity (i.e., they do not allow moisture to escape the wall cavity during humid climates).

Moreover, while it may be possible to make vapor retarding materials having desirable properties via lamination processes, such processes can be difficult and expensive to carry out on a commercial scale, due especially to the use of expensive materials.

Accordingly, there remains a need for new vapor retarding materials and cost-effective methods for making them.

SUMMARY OF THE DISCLOSURE

Innovative solutions are needed to provide novel building materials that can provide the desired water vapor permeability, particularly at variable relative humidity, at a low cost. The present inventors have found simple and cost-efficient materials that have low water vapor permeability at low relative humidities (e.g., at about 25% RH) and that can be provided as a coating on a building material substrate. Notably, in many embodiments, the materials can have high water vapor permeability at high relative humidities (e.g., at about 95% RH).

Thus, in one aspect, the present disclosure provides a vapor retarding article, comprising:
 a building material substrate; and
 a polymeric coating layer coated on the building material substrate, the polymeric coating layer being different from the building material substrate, the polymeric coating layer comprising an inorganic hydrophilic particulate filler dispersed in a continuous organic phase comprising a hydrophobic polymer, wherein the content of the filler is from about 30% to about 85% by weight of the polymeric coating layer.

In certain embodiments, the vapor retarding article is configured to have a water vapor permeance of no more than about 1 Perm (e.g., from about 0 Perm to about 1 Perm, or from about 0.1 Perm to about 1 Perm, or from about 0.3 Perm to about 1 Perm) at 25% relative humidity, as tested by ASTM E96 at 23° C.

In another aspect, the present disclosure provides a method for making a vapor retarding article, comprising:
 providing a building material substrate; and
 coating a polymeric coating layer onto the building material substrate, the polymeric coating layer being different from the building material substrate, the polymeric coating layer comprising an inorganic hydrophilic particulate filler dispersed in a continuous organic phase comprising a hydrophobic polymer, wherein the content of the filler is from about 30% to about 85% by weight of the polymeric coating layer.

In certain embodiments of the method of the disclosure, the vapor retarding article is configured to have a water vapor permeance of no more than about 1 Perm (e.g., from about 0 Perm to about 1 Perm, or from about 0.1 Perm to about 1 Perm, or from about 0.3 Perm to about 1 Perm) at 25% relative humidity, as tested by ASTM E96 at 23° C.

The present disclosure provides vapor retarding articles that are configured to have variable water vapor permeability as a function of relative humidity (RH). In certain embodiments, the articles of the disclosure are configured to have a low vapor permeance, e.g., no more than about 1 Perm (e.g., from about 0 Perm to about 1 Perm, or from about 0.1 Perm to about 1 Perm, or form about 0.3 Perm to about 1 Perm) at 25% relative humidity. In certain such embodiments, the article is configured to have a high vapor permeability, e.g., of at least about 5 Perms, or at least about 8 Perms, or at least about 12 Perms, or at least about 15 Perms, or at least about 20 Perms, at 95% relative humidity, as tested by ASTM E96 at 23° C. As used herein, a Perm is a United States Perm.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description, serve to explain the principles and operation of the disclosure.

DETAILED DESCRIPTION

Before the disclosed processes and materials are described, it is to be understood that the aspects described herein are not limited to specific embodiments, apparati, or configurations, and as such can, of course, vary. It is also to be understood that the terminology used herein is for the purpose of describing particular aspects only and, unless specifically defined herein, is not intended to be limiting.

Throughout this specification, unless the context requires otherwise, the word "comprise" and "include" and variations (e.g., "comprises," "comprising," "includes," "including") will be understood to imply the inclusion of a stated component, feature, element; or step or group of components, features, elements or steps but not the exclusion of any other integer or step or group of integers or steps.

As used in the specification and the appended claims, the singular forms "a," "an" and "the" include plural referents unless the context clearly dictates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant bath in relation to the other endpoint, and independently of the other endpoint.

All percentages, ratios and proportions herein are by weight, unless otherwise specified.

In view of the present disclosure, the processes and active materials described herein can be configured by the person of ordinary skill in the art to meet the desired need. In general, the disclosed materials, methods, and apparati provide cost-efficient improvements in building materials that have low water vapor permeability at low RH (e.g., at about 25% RH). And in certain embodiments, the article can have high water vapor permeability at high RH (e.g., more than about 45% RH).

Thus, one aspect of the disclosure provides a vapor retarding article, comprising
 a building material substrate (e.g., a building material substrate sheet), and
 a polymeric coating layer coated on the building material substrate, the polymeric coating layer being different from the building material substrate, the polymeric coating layer comprising an inorganic hydrophilic particulate filler dispersed in a continuous organic phase comprising a hydrophobic polymer, wherein the content of the filler is from about 30% to about 85% by weight of the polymeric coating layer,
wherein the vapor retarding article is configured to have a water vapor permeance of no more than about 1 Perm (e.g., from about 0 Perm to about 1 Perm, or from about 0.1 Perm to about 1 Perm, or from about 0.3 Perm to about 1 Perm) at 25% relative humidity, as tested by ASTM E96 at 23° C.

Figure 1:
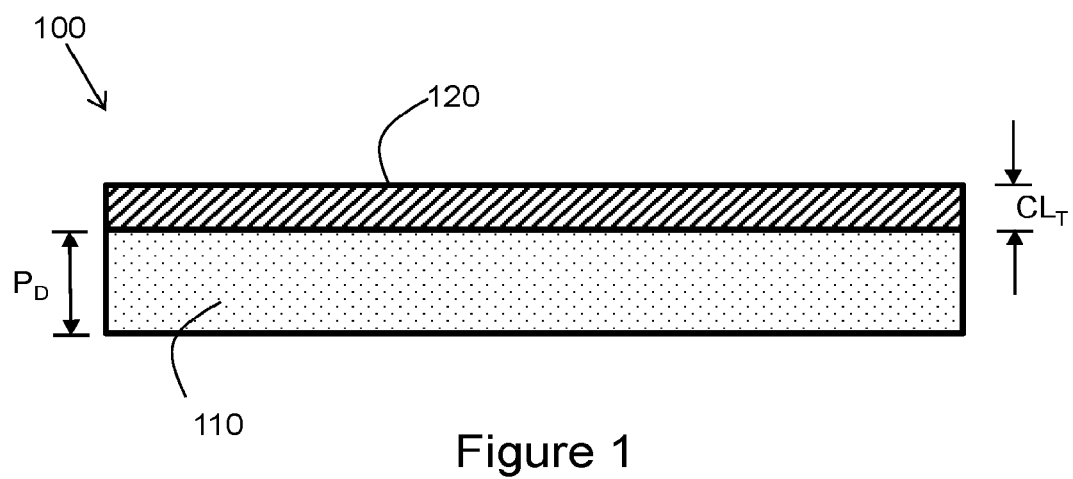
FIG. 1 is a partial schematic cross-sectional view of a vapor retarding article according to one embodiment of the disclosure.

One embodiment of the vapor retarding article of the disclosure is shown in partial schematic cross-sectional view in FIG. 1. Here, an article 100 is shown comprising a building material substrate (here, a building material substrate sheet) 110 with a polymeric coating layer 120 coated thereon. The exact thickness of the building material substrate 110 and the polymeric coating layer 120 can vary. But in many cases, when the substrate is in sheet form, the thickness of the building material substrate 110 will be of a similar thickness as the thickness of the polymeric coating layer 120 (e.g. within 30-300% of the thickness of the polymeric coating layer). While the thickness of the polymeric coating layer 120 is shown as being substantially uniform in FIG. 1, such uniformity is not required. In particular, so long as the thickness of the polymeric coating layer 120 is effective to provide the variable water vapor perm values, the thickness need not be uniform in every area of the building material substrate sheet 110.

The building material substrate can be formed from a variety of materials, as the person of ordinary skill in the art will appreciate. The coatings described herein can be formed on a variety of materials. In many desirable embodiments, the building material substrate will be in sheet form (i.e., wherein the building material substrate is a building material substrate sheet).

The building material substrate sheet can be porous or contain a pore structure, such that the polymeric coating layer can be partially disposed within the pore structure of the substrate, as will be discussed in more detail below. For example, in certain embodiments of the vapor retarding article as otherwise described herein, the building material substrate sheet is a sheet of fabric, i.e., having pores formed in the sheet. In certain such embodiments, the fabric is a woven fabric, for example, woven from thermoplastic fibers. In particular embodiments, the building material substrate can include a non-woven material. Particular non-woven materials can include spun bond or point bond fabrics. For example, in certain embodiments of the vapor retarding articles as otherwise described herein, the building material substrate is a non-woven polypropylene fabric, e.g., a point-bond polypropylene non-woven fabric. Other non-woven fabrics suitable for use in various embodiments of the vapor retarding articles as otherwise described herein include nylon non-woven fabrics, poly(ethylene terephthalate) non-woven fabrics, other polyester non-woven fabrics, polystyrene non-woven fabrics, acrylonitrile/butadiene/styrene copolymer non-woven fabrics, and polyethylene non-woven fabrics. In other embodiments, a perforated thermoplastic film can be used as the building material substrate sheet, e.g., a perforated polypropylene film, a perforated nylon film, a perforated PET film, a perforated polystyrene film, a perforated acrylonitrile/butadiene/styrene copolymer film, a perforated polyester film, or a perforated polyethylene film.

In certain embodiments of the vapor retarding articles as otherwise described herein, the building material substrate sheet is paper, such as kraft paper. The exact weight of the paper can vary, and illustrative weights include, but are not limited to, about 25 pounds to about 75 pounds per thousand square feet, for example about 39 pounds per thousand square feet. In other embodiments of the vapor retarding articles as otherwise described herein, the building material substrate sheet is a scrim.

The building material substrate sheet may itself be made from multiple sublayers of material, as the person of ordinary skill in the art would appreciate; desirably such a sheet would have pores extending through the sheet. Without intending to be bound by theory, the inventors believe that use of a porous substrate sheet can simplify the provision of desirable vapor retarding behavior to the overall article.

Advantageously, when a building material substrate is in sheet form, the vapor retarding article of the disclosure can be provided as a vapor retarding membrane. As the person of ordinary skill in the art will appreciate, the vapor retarding membranes of the disclosure can find wide use in many construction applications.

The building material substrate can alternatively be any material used in the construction of exterior or interior walls or ceilings. For example, in certain embodiments of the vapor retarding article as otherwise described herein, the building material substrate is drywall (e.g., gypsum board), wood paneling, wood planks, plywood, fiber board; fiberglass insulation, or the like. In certain embodiments, the polymeric coating layer may be coated directly on the material of the building material substrate (e.g., on a paper layer of a gypsum board).

In certain embodiments, however, the polymeric coating layer may be coated on a building material substrate sheet (e.g., kraft paper), which then can be applied to another substrate (e.g., by using an adhesive or other suitable attachment means).

As described above, coated on the building material substrate is a polymeric coating layer. The polymeric coating layer can be selected by the person of ordinary skill in the art based on the disclosure herein and based on the identity of the building material substrate to provide desired water vapor permeability values to the vapor retarding articles of the disclosure. For additional information regarding vapor retarding coatings, the person of ordinary skill in the art will refer to U.S. Patent Application Publication no. 2016/0185994, which is hereby incorporated herein by reference in its entirety. Notably, the coating layer is not a polymer extrudate or otherwise preformed thermoplastic polymer sheet that is, for example, laminated to the substrate. Rather, it is a material that is coated onto the substrate, e.g., by a conventional coating process, such as from a liquid (e.g., aqueous) solution or a suspension, such as a polymer emulsion or polymer dispersion (i.e., polymer latex).

The polymeric coating layer can include a continuous organic phase comprising a hydrophobic polymer, with an inorganic hydrophilic particulate filler dispersed therein. The continuous organic phase need not itself be absolutely homogenous; it can have different domains of different compositions. As used herein, a hydrophobic polymer is a polymer with a weight-average molecular weight no less than 10 kDa, and a water absorption of less than 1%. Water absorption, as described herein, is measured gravimetrically at 100% relative humidity and 23° C. A variety of hydrophobic polymers can be used, such as a styrene butadiene copolymer (e.g., a styrene butadiene rubber), an acrylic polymer or copolymer such as a styrene acrylic polymer, a vinyl acetate/ethylene copolymer, a poly(vinyl acetate), a poly(vinylidene chloride) polymer or copolymer, a polyvinyl chloride, a polyvinyl butyral, a polyolefin (such as polyethylene, polypropylene, polybutadiene, etc.), or combinations thereof. In certain embodiments of the vapor retarding articles as otherwise described herein, the hydrophobic polymer is coated onto the substrate as from an aqueous dispersion of the hydrophobic polymer dispersed in water, such as a polymer latex, or as from an aqueous emulsion of the hydrophobic polymer. In certain particular embodiments of the vapor retarding article as otherwise described herein, the hydrophobic polymer is a styrene butadiene rubber (e.g., coated from a latex) or styrene acrylic polymer (e.g., coated from a latex).

The hydrophobic polymer can be described by its percent (%) carboxylation. Percent carboxylation refers to the weight percentage of carboxylic acid (i.e., —COOH) in the polymer backbone. Accordingly, in certain particular embodiments of the vapor retarding article as otherwise described herein, the hydrophobic polymer has a % carboxylation of essentially 0%, at least about 0.1%, or at least about 0.5%, or even at least about 1%. In particular embodiments of the vapor retarding article as otherwise described herein, the hydrophobic polymer has a % carboxylation of no more than about 20%, or no more than about 15%, or no more than about 10%, or no more than about 5%, or even no more than about 3%. Moreover, in various embodiments of the vapor retarding article as otherwise described herein, the hydrophobic polymer has a % carboxylation in a range of any of the minimums and maximums provided above, such as within a range of from about 0% to about 20%, or about 0.1% to about 15%, or about 0.5% to about 10%, or even about 1% to about 8%. In particular embodiments of the vapor retarding article as otherwise described herein, the hydrophobic polymer can have a % carboxylation of about 0% in which case, the hydrophobic polymer would be essentially free of a carboxylic acid monomer in the polymer backbone. A particular advantage of the above mentioned % carboxylation values has been shown to be advantageous in achieving excellent permeability with relative humidity in combination with a separate hydrophilic component such as a hydrophilic polymer or a hydrophilic filler. Without wishing to be bound by theory, it is believed that at high levels of carboxylation the hydrophobic polymers tend to have too high a water vapor permeability at intermediate relative humidities.

The hydrophobic polymer can also be described by its glass transition temperature (Tg). As used herein, the glass transition temperature (Tg) of the hydrophobic polymer is measured by differential scanning calorimetry. Accordingly, in certain embodiments of the vapor retarding article as otherwise described herein, the hydrophobic polymer has a glass transition temperature (Tg) of at least about −50° C., at least about −40° C., or even at least about −30° C. In certain embodiments of the vapor retarding article as otherwise described herein, the hydrophobic polymer can have a glass transition temperature (Tg) of no more than about 35° C., or no more than about 25° C., or no more than about 25° C. or even no more than about 15° C. In certain embodiments, the hydrophobic polymer can have a glass transition temperature in a range of any of the minimums and maximums provided above, such as in a range of from about −30 to about 25° C., or about −30 to about 15° C., or even about −30 to about 0° C.

The amount of hydrophobic polymer in the coating layer can be varied by the person of ordinary skill in the art based on the present disclosure. However, in certain embodiments of the vapor retarding article as otherwise described herein, the hydrophobic polymer makes up a relatively large proportion of the continuous organic phase of the polymeric coating layer. In certain embodiments of the vapor retarding article as otherwise described herein, the hydrophobic polymer is present in the continuous organic phase of the polymeric coating layer in the amount of at least about 15 wt %, or at least about 25 wt %, or at least about 30 wt %, or at least about 40 wt %, or at least about 55 wt %, or at least about 70 wt %, or at least about 85 wt %, or at least about 95 wt %, based on the total weight of the continuous organic phase of the polymeric coating layer.

In certain embodiments of the vapor retarding article as otherwise described herein, the hydrophobic polymer is present in the continuous organic phase in an amount of about 15 wt % to about 70 wt %, or about 15 wt % to about 65 wt %, or about 15 wt % to about 50 wt %, or about 15 wt % to about 35 wt %, about 25 wt % to about 70 wt %, or about 25 wt % to about 65 wt %, or about 25 wt % to about 50 wt %, or about 30 wt % to about 70 wt %, or about 30 wt % to about 65 wt %, or about 30 wt % to about 50 wt %, or about 40 wt % to about 70 wt %, or about 40 wt % to about 65 wt %, or about 55 wt % to about 70 wt %, All wt % values described in this disclosure are on a dry weight basis, i.e., free of absorbed water.

The continuous organic phase of the polymeric coating layer can also include other components. For example, in certain embodiments of the vapor retarding article as otherwise described herein, the continuous organic phase further comprises a lower molecular weight (i.e., less than 10 kDa) organic material, such as a wax or a low molecular weight polymer. A variety of lower molecular weight organic materials can be used, e.g., polyethylene waxes, paraffin waxes, microcrystalline waxes, and other synthetic or natural waxes. The lower molecular weight material can be present in an amount, for example, up to 15 wt %, up to 10 wt %, or up to 5 wt % of the continuous organic phase.

As described in U.S. Patent Application Publication no. 2016/0185994, polymeric hydrophilic components can be included in the continuous organic layer. A polymeric hydrophilic component can absorb water, and thus increase permeability at high humidity. Polymeric hydrophilic components can thus be used to tune the water vapor permeability of the polymeric coating layer. As used herein, a polymeric hydrophilic component has a percent water absorption of at least 1% (for example, at least about 3%, at least about 5%, or even at least about 7%) as measured according to gravimetric measurements at 100% relative humidity and at 23° C. Thus, in certain embodiments of the vapor retarding article as otherwise described herein, the coating layer further includes a polymeric hydrophilic component selected from one or more of polyvinyl alcohol, poly(vinyl pyrrolidone), starch, cellulose, polyacrylic acid and salts thereof, a highly carboxylated polymer (e.g., derived from a latex), amine polymers, polyethylene oxide, vinyl ether polymers, hydrolyzed polymers (e.g., hydrolyzed maleic anhydride) and polysaccharides. In certain embodiments of the vapor retarding article as otherwise described herein, the coating layer includes a polymeric hydrophilic component (e.g., one or more of the components described above) in an amount up to about 30 wt. %, e.g., in an amount up to 20 wt %, or up to 10 wt %, or in the range of 0.1 wt % to 30 wt %, or 0.1 wt % to 20 wt %, or 0.1 wt % to 1 wt %, or 1 wt % to 30 wt %, or 1 wt % to 20 wt %, or 1 wt % to 10 wt %, or 4 wt % to 30 wt %, or 4 wt % to 20 wt %, or 4 wt % to 10 wt %, of the continuous organic phase.

However, the present inventors have noted that suitable permeability performance can be provided without using substantial amounts of polymeric hydrophilic components. Thus, in certain embodiments of the vapor retarding article as otherwise described herein, the polymeric coating layer comprises less than about 4 wt %, or less than about 3 wt %, or less than about 2 wt %, or less than about 1 wt %, or less than about 0.5 wt %, or less than about 0.1 wt %, or is essentially free of polymeric hydrophilic components. In certain embodiments of the vapor retarding article, the polymeric coating layer includes less than about 4 wt %, or less than about 3 wt %, or less than about 2 wt %, or less than about 1 wt %, or less than about 0.5 wt %, or less than about 0.1 wt %, or is essentially free of a polymeric hydrophilic components selected from polyvinyl alcohol, poly(vinyl pyrrolidone), starch, cellulose, polyacrylic acid and salts thereof, highly carboxylated polymers (e.g., derived from a latex), amine polymers, polyethylene oxide, vinyl ethers, highly hydrolyzed polymers (e.g., hydrolyzed maleic anhydride), polysaccharides and combinations thereof. In certain embodiments of the vapor retarding article, the polymeric coating layer includes less than about 4 wt %, or less than about 3 wt %, or less than about 2 wt %, or less than about 1 wt %, or less than about 0.5 wt %, or less than about 0.1 wt %, or is essentially free of polyvinyl alcohol.

As described above, the polymeric coating layers of the vapor retarding article of the present disclosure includes an inorganic hydrophilic particulate filler dispersed in the continuous organic layer. The particulate filler can serve to absorb moisture and increase the permeability of the coating layer at elevated relative humidities by transmitting moisture through the coating layer.

In certain embodiments of the vapor retarding article as otherwise described herein, the particulate filler has a median particle size (i.e., d50, $50^{th}$ percentile particle size) of about 0.5 to about 10 μm. In certain embodiments as otherwise described herein, the particulate filler has a median particle size (i.e., d50, $50^{th}$ percentile particle size) of about 1 to about 20 μm, or about 3 to about 20 μm, or about 5 to about 20 μm, or about 7 to about 20 μm, or about 1 to about 10 μm, or about 2 to about 10 μm, or about 5 to about 10 μm, or about 7 to about 10 μm, or about 1 to about 7 μm, or about 3 to about 7 μm, or about 4 to about 7 μm, or about 5 to about 7 μm, or about 1 to about 6 μm, or about 3 to about 6 μm, or about 4 to about 6 μm, or about 5 to about 6 μm, or about 1 to about 5 μm, or about 1 to about 4 μm, or about 1 to about 3 μm, or about 4.5 to about 6.5 μm, or about 4.8 to about 6.2 μm, or about 5.3 to about 5.7 μm. In certain such embodiments, the particulate filler has a d10 and a d90 value (i.e., $10^{th}$ percentile particle size and $90^{th}$ percentile particle size) within the range of about 0.3 to about 30 μm, or about 1 to about 20 μm, or about 3 to about 30 μm, or about 5 to about 20 μm, or about 7 to about 20 μm, or about 1 to about 10 μm, or about 3 to about 10 μm, or about 5 to about 10 μm, or about 7 to about 10 μm, or about 1 to about 7 μm, or about 3 to about 7 μm, or about 4 to about 7 μm, or about 5 to about 7 μm. Particle sizes as described herein are measured by laser diffraction, e.g., as in a Malvern Mastersizer 3000 Particle Analyzer. The present inventors have determined that use of particulate fillers with such sizes can provide the desired permeability behavior to the polymeric coating layer.

A wide variety of particulate fillers can be used in vapor retarding articles described herein. In certain embodiments of the vapor retarding articles as otherwise described herein, the particulate filler is alumina trihydrate (also known as aluminum trihydrate, aluminum hydroxide, hydrated alumina, or ATH), kaolin, graphite (e.g., nonexpendable graphite), calcium carbonate, barium sulfate, talc, calcium sulfate, sodium sulfate, silica, magnesium hydroxide, magnesium carbonate, antimony trioxide, clay, zinc borate, zinc oxide, zinc hydroxystannate, boehmite, aluminum diethyl phosphinate, ammonium polyphosphate, ammonium phosphate, mica, carbon black, montmorillonite, bentonite, muscovite, illite, cookeite, chlorite, diatomaceous earth, titania, or a combination thereof. The particulate filler can be selected by the person of ordinary skill in the art based on the present disclosure to provide the vapor retarding articles with suitable vapor retarding properties at various relative humidities.

For example, in certain embodiments of the vapor retarding articles as otherwise described herein, the particulate filler is alumina trihydrate, kaolin, graphite (e.g., nonexpendable graphite), calcium carbonate, magnesium hydroxide, magnesium carbonate, antimony trioxide, clay, zinc borate, zinc oxide, zinc hydroxystannate, boehmite or a combination thereof. In certain particular embodiments of the vapor retarding articles as otherwise described herein, the particulate filler is kaolin, alumina trihydrate, or a combination thereof.

In certain embodiments of the vapor retarding articles as otherwise described herein, the particulate filler is alumina trihydrate.

In certain embodiments of the vapor retarding articles as otherwise described herein, the particulate filler is kaolin.

In certain embodiments of the vapor retarding articles as otherwise described herein, the particulate filler is a combination of kaolin and alumina trihydrate, e.g., 15-50 wt % kaolin and 50-85 wt % aluminum trihydrate, e.g., about 70 wt % alumina trihydrate and about 30 wt % kaolin on a filler-filler basis (not 100% of the total formulation).

The inorganic hydrophilic particulate filler may be described by its % water absorption. As used herein, the % water absorption is determined by gravimetric measurements as is well understood in the art, Percentage of water absorption will increase the permeability vs. relative humidity relationship, but if it is too high the hydrophilic component may become soluble and destabilize the polymeric coating layer. As used herein, an inorganic hydrophilic particulate filler has a percent water absorption of at least 0.3% as measured at 100% relative humidity and at 23° C. In certain such embodiments, the inorganic hydrophilic particulate filler has a percent water absorption of at least about 1%, or at least about 3%, as measured at 100% relative humidity and at 23° C. In certain embodiments of the vapor retarding article as otherwise described herein, the inorganic hydrophilic particulate filler has a percent water absorption of no more than about 15%, or no more than about 10%, or even no more than about 7%, as measured at 100% relative humidity and at 23° C. Moreover, the inorganic hydrophilic particulate filler can have a percent water absorption in a range of any of the minimums and maximums provided above, such as in a range of from about 1% to about 15%, or even about 0.3% to about 7%, etc.

In certain embodiments of the vapor retarding articles as otherwise described herein, the inorganic hydrophilic particulate filler can have platelike morphologies (such as kaolin). This can increase the slope of the permeability vs relative humidity relationship; without intending to be bound by theory, the inventors believe that this is due to the increased tortuosity of the path through the polymeric coating layer, which can allow coatings to be applied thinner and have superior performance.

As the person of ordinary skill in the art will appreciate, the particulate filler can provide a number of additional benefits. For example, the particulate filler may provide reinforcement in the polymeric coating layer, may provide additional flame retardancy in the polymeric coating layer, may improve the physical properties of the polymeric coating layer (e.g., decrease the coefficient of linear thermal expansion (CLTE) as compared to the CLTE of a cured composition without the filler), or may provide other desired features, e.g., may improve the overall viscosity of the composition to facilitate more uniform coating on a substrate.

Illustrative commercially available fillers include, but are not limited to, Bentolite®, Cloisite®, Nanofil®, Nanothix®, and Permont® fillers available from Southern Clay Products, Inc.; Kamin brand kaolite from KaMin LLC, or Snobrite brand kaolin from Unimin, Primatec brand kaolin from Sibelco, and Micral AM-550 ATH available from Huber Engineered Materials.

The person of ordinary skill in the art will select an appropriate amount of the inorganic hydrophilic particulate filler to provide the desired vapor permeability to the article. In certain embodiments of the vapor retarding articles as otherwise described herein, the inorganic hydrophilic particulate filler is present in the polymeric coating layer in the amount of about 30 wt % to about 85 wt % based on the total dry weight of the polymeric coating layer. In various embodiments of the vapor retarding articles as otherwise described herein, the particulate filler is present in the polymeric coating layer in an amount of at least about 35 wt %, or at least about 40 wt %, or at least about 45 wt %, or at least about 50 wt %, or at least 55 wt %, or in the range of about 35 wt % to about 85 wt %, or about 50 wt % to about 85 wt %, or 55 wt % to about 85 wt %, or about 60 wt % to about 85 wt %, or about 30 wt % to about 80 wt %, or about 35 wt % to about 80 wt %, or about 50 wt % to about 80 wt %, or 55 wt % to about 80 wt %, or about 60 wt % to about 80 wt %, or about 30 wt % to about 75 wt %, or about 50 wt % to about 75 wt %, or 56 wt % to about 75 wt %, or about 60 wt % to about 75 wt %, or about 30 wt % to about 70 wt %, or about 50 wt % to about 70 wt %, or 55 wt % to about 70 wt %, or about 60 wt % to about 70 wt % based on the total dry weight of the polymeric coating layer. One of skill in the art will recognize that the weight %) amounts reflect the total amount of the particulate filler in the composition, regardless of whether the particulate filler is a combination of two or more materials.

The present inventors have determined that alumina trihydrate (ATH) can provide especially beneficial permeability behavior. Accordingly, in certain embodiments of the vapor retarding articles as otherwise described herein, the particulate filler is alumina trihydrate. In certain such embodiments, the alumina trihydrate has a median particle size of about 1 to about 10 μm, e.g., about 1 to about 8 μm, or about 1 to about 6 μm, or about 3 to about 10 μm, or about 4 to about 8 μm, or about 3 to about 6 μm, or about 5 to about 6 μm, or about 5.3 to about 5.7 μm, optionally with d10/d90 values in the range of about 2 to about 10 μm, e.g., about 1 to about 8 μm, or about 1 to about 6 μm, or about 4 to about 10 μm, or about 4 to about 8 μm, or about 4 to about 6 μm. In certain such embodiments, the alumina trihydrate is present in an amount of about 5 wt % to about 75 wt %, for example, about 5 wt % to about 45 wt %, or about 5 wt % to about 30 wt %, or about 10 wt % to about 60 wt %, or about 10 wt % to about 45 wt %, or about 10 wt % to about 30 wt %, or about 20 wt % to about 60 wt %, or about 20 wt % to about 45 wt %, or about 50 wt % to about 75 wt % of the coating layer.

Kaolin can also be advantageously used as a particulate filler in the vapor retarding articles of the disclosure. Thus, in certain embodiments of the vapor retarding articles as otherwise described herein, the particulate filler is kaolin. In certain such embodiments, the kaolin has a median particle size of about 1 to about 10 μm, e.g., about 1 to about 8 μm, or about 1 to about 6 μm, or about 3 to about 10 μm, or about 3 to about 8 μm, or about 3 to about 6 μm, optionally with d10/d90 values in the range of about 1 to about 10 μm, e.g., about 1 to about 8 μm, or about 1 to about 6 μm, or about 3 to about 10 μm, or about 3 to about 8 μm, or about 3 to about 6 μm. In certain such embodiments, the kaolin is present in an amount of about 5 wt % to about 60 wt %, for example, about 5 wt % to about 45 wt %, or about 5 wt % to about 30 wt %, or about 10 wt % to about 60 wt %, or about 10 wt % to about 45 wt %, or about 10 wt % to about 30 wt %, or about 20 wt % to about 60 wt %, or about 20 wt % to about 45 wt % of the coating layer.

The inventors have determined that suitable coating layers can be formed substantially from a combination of hydrophobic polymer and particulate filler. For example, in certain embodiments of the vapor retarding articles as otherwise described herein, the combined content of the particulate filler and the hydrophobic polymer is at least about 80 wt % based on the total dry weight of the polymeric coating layer. In various embodiments of the vapor retarding articles as otherwise described herein, the combined content of the particulate filler and the hydrophobic polymer is at least about 85 wt %, or at least about 90 wt %, or at least about 95 wt %, or at least about 97 wt %, or at least about 98 wt %, or at least about 99 wt %, or about 100 wt % of the polymeric coating layer.

The ratio of hydrophobic polymer to particulate filler can vary in the polymeric coating layers of the vapor retarding articles of the disclosure. In certain embodiments of the vapor retarding articles as otherwise described herein, the hydrophobic polymer and the particulate filler are present in a weight ratio in the range of about 3:1 to about 1:3 (i.e., hydrophobic polymer:particulate filler), e.g., about 3:1 to about 1:2, or about 3:1 to about 1:1, or about 3:1 to about 1.5:1, or about 3:1 to about 2:1, or about 2:1 to about 1:2, or about 2:1 to about 1:1, or about 2:1 to about 1.5:1, or about 1.5:1 to about 1:3, or about 1.5:1 to about 1:2, or about 1.5:1 to about 1:1.

As the person of ordinary skill in the art will appreciate, the polymeric coating layer can optionally include a number of conventional components, such as one or more of viscosity modifiers, pigments, dyes, UV absorbers, slip additives, surfactants, defoamers, and deaerators. Such components are desirably present in a total amount of no more than 20 wt %, e.g., no more than 15 wt % or even no more than 10 wt % of the polymeric coating layer.

In certain embodiments of the vapor retarding articles as otherwise described herein, the polymeric coating layer also includes one or more biocidal agents. The biocidal agent can be effective to deter or prevent growth of organisms on the coating and/or surface of the substrate. In some embodiments, the biocidal agent can be effective as a fungicide, e.g., a moldicide, to prevent growth of mold or other fungus on the surface of the substrate. In other embodiments, the biocidal agent can be effective to prevent growth of bacteria, moss, algae or other organisms on the surface of the substrate, Where present, the biocidal agent may be present in an effective amount to deter or prevent growth of bio organisms. The biocidal agent, if present, is desirably present in an amount of no more than 5 wt %, e.g., no more than 2 wt % of the polymeric coating layer.

In certain embodiments of the vapor retarding articles as otherwise described herein, the polymeric coating layer can also include one or more stain-resistance additives. In some examples, the stain-resistance additive can act to reduce or prevent materials from being adsorbed into the coating and can generally assist in sealing the coating from penetration by materials other than water and gases. For example, the stain-resistance additive can provide oil resistance or oil repellency to prevent non-polar species from becoming trapped in the coating. The stain-resistance additives may also inhibit fading of the coating if exposed to heat, ultraviolet light or other forms of energy, illustrative stain-resistance additives are commercially available, for example, from 3M (e.g., SRC-220, PM-5000, PM-1680, PM-4800) and AkzoNobel (e.g., Elotex® stain-resistance additives). The stain resistance additive, if present, is desirably present in an amount of no more than 5 wt %, e.g., no more than 2 wt % of the polymeric coating layer.

The polymeric coating layers can be provided at a variety of thicknesses to provide the desired vapor permeability behavior. In certain embodiments of the vapor retarding articles as otherwise described herein, the polymeric coating layer has a coat weight of at least about 10 $g/m^2$, at least about 20 $g/m^2$, or even at least about 40 $g/m^2$, In certain embodiments, the polymeric coating layer can have a coat weight of no greater than about 1000 $g/m^2$, or even no greater than about 500 $g/m^2$. For example, in certain embodiments of the vapor retarding articles as otherwise described herein the coat weight of the polymeric coating layer is in the range of about 10 $g/m^2$ to about 1000 $g/m^2$, or about 20 $g/m^2$ to about 1000 $g/m^2$, or about 40 $g/m^2$ to about 1000 $g/m^2$, or about 10 $g/m^2$ to about 500 $g/m^2$, or about 20 $g/m^2$ to about 500 $g/m^2$, or about 40 $g/m^2$ to about 500 $g/m^2$, Typical rates for spray-coated polymer coating layers can be, for example, in the range of 150-300 $g/m^2$, e.g., 200-250 $g/m^2$.

In certain embodiments as otherwise described herein, the vapor retarding article of the disclosure can be characterized by its water vapor permeability as a function of relative humidity (RH). The water vapor permeability is a measure of the amount of water vapor that can pass through a material. The water vapor permeability values discussed herein are measured according to ASTM E96 at a temperature of 23° C. at the selected average RH values.

In certain embodiments, the vapor retarding articles of the disclosure are so-called "smart vapor retarder" membranes. For example, in certain embodiments the disclosure provides a vapor retarding membrane that is configured to have a water vapor permeability of no more than about 1 Perm at 25% relative humidity (e.g., as described above) but a water vapor permeability of at least about 5 Perms (e.g., at least about 8 Perms, at least about 12 Perms, at least about 15 Perms, or at least about 20 Perms) at 95% relative humidity. In certain embodiments, the disclosure provides a vapor retarding membrane that is configured to have a water vapor permeability of no more than about 6 Perms at 45% relative humidity (e.g., no more than about 4 Perms, or about 0.3 Perms to about 6 Perms, or about 0.3 Perms to about 4 Perms, or about 1 Perm to about 6 Perms, or about 1 Perm to about 4 Perms), and at least about 5 Perms (e.g., at least about 8 Perms, at least about 12 Perms, at least about 15 Perms, or at least about 20 Perms) at 95% relative humidity. In certain such embodiments, the membrane is configured to have a water vapor permeability of no more than about 1 Perm at 25% relative humidity. Water vapor permeability values are tested as described in ASTM E96 at 23° C. In certain such embodiments, the vapor retarding articles of the disclosure can exhibit a desirable water vapor permeability at low, medium, and high relative humidities. For example, in certain embodiments, a vapor retarding membrane as otherwise described herein is configured to have a water vapor permeability rating of about 6 Perms or less, or even about 4 Perms or less at 45% average RH; in certain such embodiments, the water vapor permeability rating is at least about 0.3 Perms or at least about 1 Perm at 45% relative humidity. In certain embodiments, a vapor retarding membrane as otherwise described herein is configured to have a water vapor permeability rating in a range of from about 5 Perms to about 18 Perms (e.g., about 5 Perms to about 12 Perms) at 75% average RH. In certain embodiments, a vapor retarding membrane as otherwise described herein is configured to have a water vapor permeability rating of at least about 5 Perms, e.g., at least about 8 Perms, at least about 12 Perms, at least about 15 Perms, or at least about 20 Perms, at 95% average RH. In certain embodiments, the disclosure provides a vapor retarding membrane that is configured to have a water vapor permeability of no more than 6 Perms (e.g., and no less than 0.3 Perms) at 45°/s relative humidity, at least about 5 Perms (e.g., at least about 8 Perms, at least about 12 Perms, at least about 15 Perms, or at least about 20 Perms) at 95% relative humidity. In certain such embodiments, the membrane is configured to have a water vapor permeability of no more than about 1 Perm at 25% relative humidity.

The vapor retarding membranes of the disclosure can be configured to have various combinations of the water vapor permeability values provided above at the different relative humidities. For example, in certain embodiments, a vapor retarding membrane as otherwise described herein is configured to have a water vapor permeability rating of about 1 Perm or less at 25% average RH; and a water vapor permeability rating of at least about 5 Perms (e.g., at least about 8 Perms, at least about 12 Perms, at least about 15 Perms, or at least about 20 Perms) at 95% average RH. In certain embodiments, a vapor retarding membrane as otherwise described herein is configured to have a water vapor permeability rating of about 1 Perm or less at 25% average RH; a water vapor permeability rating of at least about 5 Perms (e.g., at least about 8 Perms, at least about 12 Perms, at least about 15 Perms, or at least about 20 Perms at 95% average RH; and a water vapor permeability rating of about 6 Perms or less, about 4 Perms or less, or even about 2.5 Perms or less at 45% average RH. In certain further embodiments, a vapor retarding membrane as otherwise described herein is configured to have a water vapor permeability rating of about 1 Perm or less at 25% average RH; a water vapor permeability rating of at least about 5 Perms (e.g., at least about 8 Perms, at least about 12 Perms, at least about 15 Perms, or at least about 20 Perms) at 95% average RH; a water vapor permeability rating of about 6 Perms or less, about 4 Perms or less, or even about 2.5 Perms or less at 45% average RH; and a water vapor permeability rating in a range of from about 5 Perms to about 18 Perms (e.g., about 5 Perms to about 12 Perms) at 75% average RH.

It is to be understood, however, that the above recited combinations of water vapor permeability ratings at different relative humidities are exemplary combinations, and all possible combinations of the above-recited water vapor permeability ratings in the article are within the scope of the present disclosure, it is further noted that when an article displays the water vapor Perm rating noted above at different RH values, the change in Perm rating as humidity increases may, as noted herein, be linear or non-linear in a plot of the log of the permeability vs the relative humidity.

In certain embodiments, the vapor retarding articles of the disclosure can exhibit an advantageous nail tear resistance. The nail tear resistance is a measure of the article's ability to prevent tearing after a puncture. As used herein, the nail tear resistance is measured according to FIN 12310-1. Accordingly, in certain embodiments, a vapor retarding article as otherwise described has a nail tear resistance of at least about 1 N/5 cm, at least about 5 N/5 cm, or even at least about 10 N/5 cm.

In certain embodiments, the vapor retarding articles of the disclosure can exhibit an advantageous tensile strength. As used herein, tensile strength is measured according to EIN 12311-2. Accordingly, in certain embodiments, a vapor retarding article as otherwise described has a tensile strength of at least about 10 N/5 cm, at least about 25 N/5 cm, or even at least about 40 N/5 cm. Further, in certain embodiments, a vapor retarding article as otherwise described has a UV-aged tensile strength of at least about 10 N/5 cm, at least about 25 N/5 cm, or even at least about 40 N/5 cm. As used herein, UV-aged tensile strength is measured after UV aging for 180 hours at 0.5 W/m$^2$.

In certain embodiments, the vapor retarding articles of the disclosure can exhibit an advantageous tape adhesion. Tape adhesion is a measure of the ability of the article to stick to and release from an adhesive tape. As used herein, tape adhesion is measured according to EIN 12317-2. Accordingly, in certain embodiments, a vapor retarding article as otherwise described has a tape adhesion of at least about 15 N/5 cm, at least about 20 N/5 cm, or even at least about 25 N/5 cm.

The vapor retarding articles of the disclosure can be provided in a variety of thicknesses. For example, in certain embodiments, a vapor retarding article as otherwise described herein has a thickness of at least about 5 microns, at least about 10 microns, at least about 50 microns, at least about 100 microns, or even at least about 200 microns. In certain embodiments, a vapor retarding article as otherwise described herein has a thickness no greater than about 1000 microns, no greater than about 750 microns, or even no greater than about 500 microns. In certain embodiments as otherwise described herein, the thickness of a vapor retarding article of the disclosure is in the range of about 5 microns to about 1000 microns, or about 50 microns to about 1000 microns, or about 100 microns to about 1000 microns, or about 200 microns to about 1000 microns, or about 5 microns to about 750 microns, or about 50 microns to about 750 microns, or about 100 microns to about 750 microns, or about 200 microns to about 750 microns, or about 5 microns to about 500 microns, or about 50 microns to about 500 microns, or about 100 microns to about 500 microns, or about 200 microns to about 500 microns.

As the person of ordinary skill in the art will appreciate, the polymeric coating layer described above can be coated onto the building material substrate in order to form a vapor retarding article of the disclosure. A particular advantage of certain embodiments of the present disclosure is the ability of the polymeric coating layer described above to be used in conjunction with relatively porous building material substrates, such as non-woven fabrics and perforated sheets. For example, the characteristics of certain embodiments of the coating layers described herein can substantially completely fill the void spaces within a building material substrate, and thereby provide an effective coating for retarding water vapor. Other compositions that could potentially provide a variable water vapor permeability as a function of humidity could not be used with relatively porous building material substrates, as the composition would "bleed through" the substrate and lead to discontinuous and ineffective coatings due to the low viscosity of the coating fluid. The current inventors have surprisingly discovered a way to provide both an effective coating viscosity with a variable water vapor permeability enabling use on relatively porous building material substrates. However, it is to be understood that certain embodiments are not limited to the use of relatively porous building material substrates.

Figure 2:
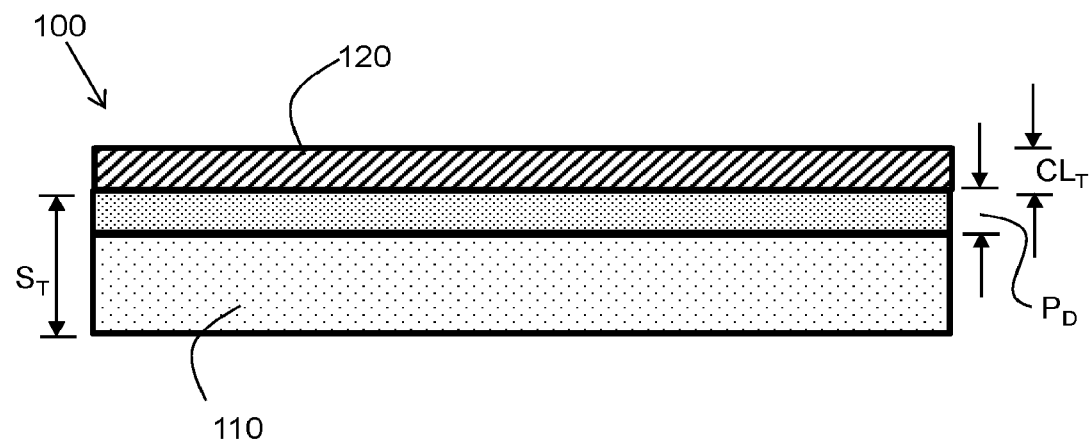
FIG. 2 is a partial schematic cross-sectional view of a vapor retarding article according to one embodiment of the disclosure.

In certain embodiments, as illustrated in FIG. 2, the polymeric coating layer 120 can penetrate a building material substrate 110 a desired depth $P_D$ into the building material substrate. In particular embodiments, the coating layer does not bleed through the entire building material substrate (e.g., it only partially bleeds into the building material substrate). For example, in certain embodiments, the building material substrate thickness ST can be greater than $P_D$ such that one major surface of the building material substrate is essentially free of the polymeric coating layer. Further, the polymeric coating layer can have a thickness $CL_T$ as indicated in FIG. 2 measured from the outermost surface of the polymeric coating layer to the distance the polymeric coating layer penetrates into the building material substrate.

Thus, in certain embodiments, the polymeric coating layer is partly embedded within the building material substrate. In certain embodiments, the polymeric coating layer is embedded within the building material substrate by about 5% to about 100% of the thickness of the polymeric coating layer, or by about 5% to about 50% of the thickness of the polymeric coating layer; or by about 5% to about 80%, or by about 5% to about 70%, or by about 5% to about 60%, or by about 5% to about 40%, or by about 30% to about 80%, or by about 30% to about 70%, or by about 30% to about 60%, or by about 30% to about 50%, or by at least about 1%, or at least about 5%, or even at least about 10% of the thickness of the polymeric coating layer.

In further embodiments, the polymeric coating layer can penetrate into the building material substrate by no more than 95%, no more than 90%, or even no more than 85% of the thickness of the building material substrate. In certain embodiments, the polymeric coating layer can penetrate into the building material substrate by at least about 1%, or at least about 5%, or even at least about 10% of the thickness of the building material substrate.

Figure 3:
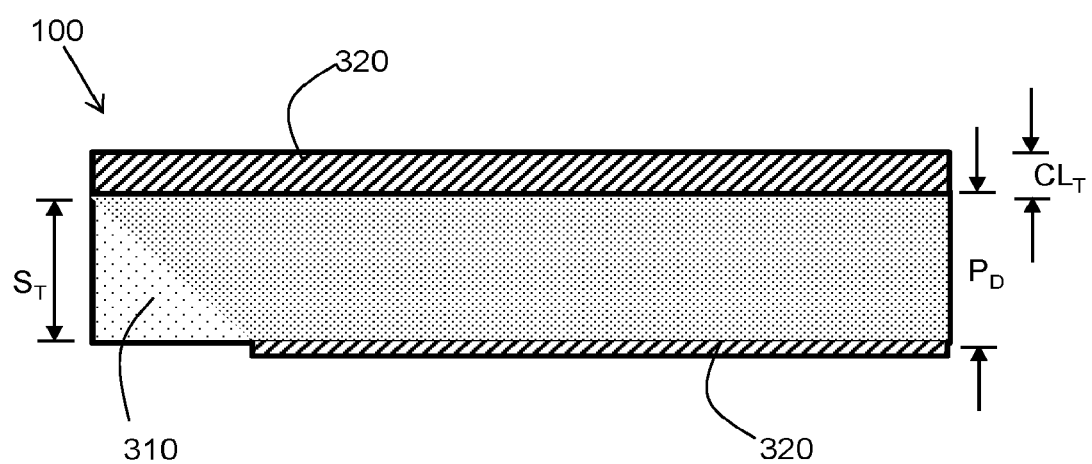
FIG. 3 is a partial schematic cross-sectional view of a vapor retarding article according to one embodiment of the disclosure.

In other embodiments, the building material substrate can be completely saturated such that the polymeric coating layer is disposed on both major surfaces of the building material substrate. For example, the $P_D$ can be greater than or equal to the ST. Further, the polymeric coating layer can have a desirable thickness atop both major surfaces of the building material substrate. FIG. 3 is cross-sectional schematic view of such an embodiment. Here, building material substrate 310 is in the form of a porous sheet impregnated with polymeric coating material, such that the polymeric coating layer 320 is disposed on both major surfaces of the sheet 310.

In another aspect, the disclosure provides method for preparing a vapor retarding article as otherwise described herein. The method includes:
providing a building material substrate; and
coating a polymeric coating layer onto the building material substrate, the polymeric coating layer comprising an inorganic hydrophilic particulate filler dispersed in a continuous organic phase comprising a hydrophobic polymer, wherein the content of the filler is from about 30% to about 85% by weight of the polymeric coating layer.

The methods described herein can be used to make the vapor retarding articles described herein.

The person of ordinary skill in the art will appreciate that a variety of building material substrates can be used in practicing the methods described herein, for example, the building material substrates described above. Similarly, a variety of polymeric coating materials can be used in practicing the methods described herein, for example, the coating materials described above.

The person of ordinary skill in the art will appreciate that the polymeric coating layer can be coated onto the building material substrate in a variety of ways. The polymeric coating layer can be coated from a liquid dispersion (e.g.; an aqueous polymer latex) or a liquid emulsion, for example, using polymer dispersion or polymer emulsion techniques. Advantageously, the present inventors have determined that aqueous coating technologies can be used to provide polymeric coating layers that can provide advantageous vapor retardance behavior, at advantageously low cost and high process simplicity. A coating liquid containing the hydrophobic polymer, the particulate filler, and any other additives dispersed in a volatile liquid (e.g., water), can be coated onto the building material substrate by rolling (e.g., forward roll, reverse roll), roll to roll coating, slot die coating, mayer rod coating, knife coating, indirect gravure coating, spraying, or any other convenient method. The coated liquid can be allowed to cure by drying to provide the polymeric coating layer. The desired thickness of the polymeric coating layer can be built up in a single coat or through multiple coating steps, e.g., with at least partial drying of each coat between coating steps. The person of ordinary skill in the art can provide a coating liquid with a desired viscosity suitable to provide a desired process and thickness of polymeric coating layer and the desired vapor permeability behavior. For example, in certain embodiments of the vapor retarding articles as otherwise described herein, the coating liquid can have a viscosity of at least about 1000 cps at a shear rate of 1 s$^{-1}$ at a temperature of 21° C. In further embodiments, the coating liquid can have a viscosity of no greater than about 1000 cps at a shear rate of 1000 s$^{-1}$ at a temperature of 21° C. Moreover, the coating liquid can have a viscosity of at least about 5000 cps at a shear rate of 1 s$^{-1}$ a temperature of 21° C. and a viscosity of no greater than about 1000 cps at a shear rate of 1000 s$^{-1}$ at a temperature of 21° C.

Certain aspects of the disclosure are now explained further via the following non-limiting examples.

EXAMPLES

Samples were prepared and tested for water vapor permeability. Samples were prepared by mixing the ingredients with a motorized cowles blade, or a homogenizer, or by hand for 5 minutes at room temperature. The coatings were applied by wound wire rod (Mayer rod) or by a slot die process at a thickness of approximately 75 microns.

The samples were then tested for vapor permeability values under ASTM E96 at 23° C. and at average relative humidities of 25% RH, 45% RH, 75% RH, and 95% RH. Specifically, samples were then sealed over either dry cups filled with desiccant to achieve the 25% and 45% average relative humidity conditions or sealed over wet cups filled with DI water to achieve the 75% and 95% RH conditions. The cups were placed in a humidity chamber at either 50% (for 25% or 75% average RH conditions) or 90% RH (for the 45% or 95% average RH conditions). For each condition, the cup was either manually weighed seven times, once every day or automatically weighed every hour until six consecutive data points reach equilibrium by using the Gintronic Gravitest Permeability tester in accordance with ASTM E96.

Example 1

A polymeric coating layer of Example 1 is provided in Table 1. The wet wt values for the components are based on total wet weight of the liquid formulation from which the polymeric coating layer was coated; the dry wt % for the components are based on total dry weight of the polymeric coating layer composition.

TABLE 1

| Component | Trade Name (Manufacturer) | Formulation (wet wt %) | Formulation (dry wt %) |
|---|---|---|---|
| Styrene butadiene latex | Rovene 4002 (Mallard Creek) | 64.31 | 55.49 |
| Kaolin clay | Snobrite 75 (Unimin) | 25.25 | 43.58 |
| Water | Tap water | 9.46 | 0 |
| Dispersant | Tamol 1124 (Dow) | 0.88 | 0.76 |
| Defoamer | Surfynol DF-58 (Air Products) | 0.10 | 0.17 |

The coating composition of Example 1 was coated onto 40 lb Kraft paper. This article was tested, and at a thickness of 55 microns it exhibited: 0.65 Perm at 25% RH; 1.2 Perm at 45% RH; 6.1 Perm at 75% RH; 26 Perm at 95% RH Example 2

A polymeric coating layer of Example 2 is provided in Table 2. The wet wt % values for the components are based on total wet weight of the liquid formulation from which the polymeric coating layer was coated; the dry wt % for the components are based on total dry weight of the polymeric coating layer composition.

TABLE 2

| Component | Trade Name (Manufacturer) | Formulation (wet wt %) | Formulation (dry wt %) |
|---|---|---|---|
| Styrene acrylic latex | Polidisp 7602 (Resiquímica) | 53.2 | 45.9 |
| Kaolin clay | Primatec (Sibelco) | 30.1 | 51.9 |
| Water | Tap water | 14.9 | 0 |
| TiO$_2$ | XFast White 0025 (BASF) | 0.58 | 1.0 |
| HALS stabilizer | Tinuvin 292 (BASF) | 0.19 | 0.3 |
| Dispersant | Tamol 1124 (Dow) | 0.90 | 0.8 |
| Defoamer | Surfynol DF-58 (Air Products) | 0.1 | 0.1 |

The polymeric coating composition of Example 2 was coated onto Radici 50, which is a 50 g/m$^2$ polypropylene non-woven sheet produced by RadiciGroup (Gandino, Italy). This article was tested, and its permeance was 0.99 Perm at 25% RH; 3 Perm at 45% RH; 12 Perm at 75% RH; 44.5 Perm at 95% RH. Certain target values listed in Table 3 are desirable values in certain applications, and do not limit the scope of the disclosure. Measured values are provided in Table 4. This material did not pass Fire Class E flame requirements.

TABLE 3

| Features | | Target Values | | Target after 180 h UV Aging at 0.5 W/m$^2$, 50° C. | Test Method |
|---|---|---|---|---|---|
| Diffusion-Equivalent Air Layer Thickness S$_d$ value (m) | | 0:50% RH, 23° C. | 3-5 | ≥2.5 | ASTM E96 |
| | | 50:93% RH, 23° C. | ≤1 | ≤1 | ASTM E96 |
| | | 0:75% RH, 23° C. | ≥2 | ≥2 | ASTM E96 |
| Mechanical Properties (GS20) | Max. Tensile Force (N/5 cm) | Longitudinal | ≥100 | ≥64 | EIN 12311-2 |
| | | Transversal | ≥100 | ≥58 | EIN 12311-2 |
| | Max. Tensile Elongation (%) | Longitudinal | ≥49 | ≥31 | EIN 12311-2 |
| | | Transversal | ≥55 | ≥28 | EIN 12311-2 |
| | Nail Tear Resistance (N) | Longitudinal | ≥60 | ≥25 | EIN 12310-1 |
| | | Transversal | ≥60 | ≥25 | EIN 12310-1 |
| System Behavior | Resistance to Shearing (N/5 cm) | Longitudinal | >80 | >80 | |
| | | Transversal | >40 | >30 | |
| | Resistance to Peeling (N/5 cm) | Longitudinal | >30 | Not specified | |
| | | Transversal | >30 | Not specified | |
| | Resistance to Peeling on Support (N/5 cm) | Concrete | >70 | Not specified | |
| | | Metal | >60 | Not specified | |
| Airtightness [m$^3$/(m$^2$.h.50 Pa)] | | | 0 | 0 | |

TABLE 4

| Features | | Results | | Results after 180 h UV Aging at 0.5 W/m$^2$, 50° C. | Test Method |
|---|---|---|---|---|---|
| Diffusion-Equivalent Air Layer Thickness S$_d$ value (m) | | 0:50% RH, 23° C. | 3-5 | ≥2.5 | ASTM E96 |
| | | 50:93% RH, 23° C. | ≤1 | ≤1 | ASTM E96 |
| | | 0:75% RH, 23° C. | ≥2 | ≥2 | ASTM E96 |
| Mechanical Properties (GS20) | Max. Tensile Force (N/5 cm) | Longitudinal | 120 | 126 | EIN 12311-2 |
| | | Transversal | 168 | 123 | EIN 12311-2 |
| | Max. Tensile Elongation (%) | Longitudinal | 71 | 80 | EIN 12311-2 |
| | | Transversal | 73 | 50 | EIN 12311-2 |
| | Nail Tear Resistance (N) | Longitudinal | ≥60 | 52 | EIN 12310-1 |
| | | Transversal | 85 | | EIN 12310-1 |
| System Behavior | Resistance to Shearing (N/5 cm) | Longitudinal | 100 | 122 | |
| | | Transversal | | | |
| | Resistance to Peeling (N/5 cm) | Longitudinal | 46 | Not specified | |
| | | Transversal | | Not specified | |
| | Resistance to Peeling on Support (N/5 cm) | Concrete | | Not specified | |
| | | Metal | | Not specified | |
| Airtightness [m$^3$/(m$^2$.h.50 Pa)] | | | 0 | 0 | |

Examples 3-24

Examples 3-24 provide a vapor retarding article according to certain embodiments of the disclosure. These articles were prepared as follows. First, the polymeric coating composition was prepared by initially stirring tap-water, defoamer (if present), and dispersant (if present). The amount of water is determined based on the desired solids percent. Next, the hydrophobic polymer was added and mixed for about one minute with a Cowles blade at moderate shear rates. The inorganic hydrophilic particulate filler (e.g., kaolin and/or alumina trihydrate (ATH)) was then added while simultaneously mixing with a Cowles blade. Mixing is continued for a few minutes after all of the particulate filler has been added. The polymeric coating composition was then coated on the substrate using Mayer rod (size 50) method. The prepared articles were tested, and their performance is provided in Table 5.

The hydrophobic polymer latexes used include: styrene acrylic latex Primal P-308 (from Dow), styrene butadiene latex Rovene 4002 (from Mallard Creek), styrene acrylic latex Polidisp 7602 (from Resiquimica), polyvinylidiene dichloride latex Trinseo XU31904 (from Trinseo)

TABLE 5

| Ex. No. | substrate | hydrophobic polymer | wt % poly. | hydrophilic filler | wt % filler | wt % defoamer[1] | wt % dispersant[2] | UV stabilizer | wt % UV stabilizer |
|---|---|---|---|---|---|---|---|---|---|
| 3 | 40 lb Kraft paper | Rovene 4002 | 44.7 | Micral AM-550 ATH | 35.2 | 0.1 | 0 | NA | 0 |
|  |  |  |  | snobrite 60 Kaolin | 20 |  |  |  |  |
| 4 | 40 lb Kraft paper | Rovene 4002 | 34.9 | Micral AM-550 ATH | 45 | 0.1 | 0 | NA | 0 |
|  |  |  |  | snobrite 60 Kaolin | 20 |  |  |  |  |
| 5 | 40 lb Kraft paper | Rovene 4002 | 34.9 | Micral AM-550 ATH | 35 | 0.1 | 0 | NA | 0 |
|  |  |  |  | snobrite 60 Kaolin | 30 |  |  |  |  |
| 6 | 40 lb Kraft paper | Rovene 4002 | 34.9 | Micral AM-550 ATH | 65 | 0.1 | 0 | NA | 0 |
| 7 | 40 lb Kraft paper | Rovene 4002 | 19.9 | Micral AM-550 ATH | 80 | 0.1 | 0 | NA | 0 |
| 8 | PP non-woven | Polidisp 7602 | 45.9 | Primatec Kaolin | 51.8 | 0.1 | 0.9 | $TiO_2$ tinuvin | 1 0.3 |
| 9 | PP non-woven | Polidisp 7603 | 45.9 | Primatec Kaolin | 46.8 | 0.1 | 0.9 | $TiO_3$ tinuvin | 1 0.3 |
|  |  |  |  | 220-50N expandable graphite | 5 |  |  |  |  |
| 10 | 40 lb Kraft paper | Rovene 4002 | 55.4 | Snobrite 60 Kaolin | 43.6 | 0.2 | 0.8 | NA | 0 |
| 11 | 40 lb Kraft paper | Rovene 4002 | 55.4 | Micral AM-550 ATH | 43.6 | 0.2 | 0.8 | NA | 0 |
| 12 | PP non-woven | Trinseo XU31904 | 55.4 | Snobrite 60 Kaolin | 43.6 | 0.2 | 0.8 | NA | 0 |
| 13 | PP non-woven | Trinseo XU31904 | 55.4 | Micral AM-550 ATH | 43.6 | 0.2 | 0.8 | NA | 0 |
| 14 | PP non-woven | Primal P-308 | 49.9 | Micral AM-550 ATH | 50 | 0.1 | 0 | NA | 0 |
| 15 | PP non-woven | Primal P-308 | 29.9 | Micral AM-550 ATH | 70 | 0.1 | 0 | NA | 0 |
| 16 | PP non-woven | Primal P-308 | 35.9 | Micral AM-550 ATH | 53.9 | 0.1 | 0 | NA | 0 |
|  |  |  |  | Primatec Kaolin | 10 |  |  |  |  |
| 17 | PP non-woven | Primal P-308 | 25.9 | Micral AM-550 ATH | 53.9 | 0.1 | 0 | NA | 0 |
|  |  |  |  | Primatec Kaolin | 20 |  |  |  |  |
| 18 | PP non-woven | Polidisp 7602 | 29.4 | Micral AM-550 ATH | 49 | 0.1 | 0.6 | $TiO_3$ tinuvin | 1 0.3 |
|  |  |  |  | Primatec Kaolin | 19.6 |  |  |  |  |
| 19 | PP non-woven | Polidisp 7602 | 29.4 | SB-632 ATH | 49 | 0.1 | 0.6 | $TiO_3$ tinuvin | 1 0.3 |
|  |  |  |  | Primatec Kaolin | 19.6 |  |  |  |  |
| 20 | PP non-woven | Polidisp 7602 | 29.4 | HN-532 ATH | 49 | 0.1 | 0.6 | $TiO_3$ tinuvin | 1 0.3 |
|  |  |  |  | Primatec Kaolin | 19.6 |  |  |  |  |
| 21 | 40 lb Kraft paper | Rovene 4002 | 19.9 | Micral AM-550 ATH | 80 | 0.1 | 0 | NA | 0 |
| 22 | 40 lb Kraft paper | Rovene 4002 | 24.9 | Micral AM-550 ATH | 75 | 0.1 | 0 | NA | 0 |

TABLE 5-continued

| | | | | | | | | | |
|---|---|---|---|---|---|---|---|---|---|
| 23 | 40 lb Kraft paper | Rovene 4002 | 29.9 | Micral AM-550 ATH | 70 | 0.1 | 0 | NA | 0 |
| 24 | 40 lb Kraft paper | Rovene 4002 | 34.9 | Micral AM-550 ATH | 65 | 0.1 | 0 | NA | 0 |

| Ex. No. | wt % wet solids | coating thickness (μm) | Permeance at 25% RH (Perm) | Permeance at 45% RH (Perm) | Permeance at 75% RH (Perm) | Permeance at 95% RH (Perm) |
|---|---|---|---|---|---|---|
| 3 | 69 | 55 | 0.65 | 1.2 | 6.1 | 26 |
| 4 | 69.3 | 53 | 0.38 | 0.88 | 9.8 | 38 |
| 5 | 67 | 52 | 0.76 | 1.6 | 12 | 48 |
| 6 | 74.1 | 64 | 0.34 | 0.49 | 4.7 | 15 |
| 7 | 75.2 | 82 | 4.2 | 6.5 | 9.9 | 32 |
| 8 | 58 | 64 | 0.99 | 3 | 12 | 44.5 |
| 9 | 58 | 67 | 1 | 3.1 | 13 | 48 |
| 10 | 62 | 55 | 0.89 | 2.4 | 8.9 | 34 |
| 11 | 64 | 51 | 0.92 | 1.4 | 3.7 | 9.2 |
| 12 | 64 | 68 | 0.75 | 6.3 | 20 | 79 |
| 13 | 64 | 57 | 0.4 | 6.7 | 31 | 90 |
| 14 | 66.7 | 102 | 2.1 | 2.8 | 5.1 | 7.8 |
| 15 | 67.8 | 105 | 1.9 | 2.5 | 4.6 | 7.6 |
| 16 | 69.3 | 88 | 1.8 | 3.4 | 8.2 | 20 |
| 17 | 66 | 98 | 1 | 3 | 16 | 66 |
| 18 | 70 | 79 | 0.75 | 1.1 | 5.9 | 23 |
| 19 | 70 | 87 | 0.78 | 1.1 | 5.9 | 24 |
| 20 | 70 | 81 | 0.74 | 1.1 | 7.2 | 29 |
| 21 | 75 | 63 | 7.3 | 11 | 19 | 45 |
| 22 | 75 | 51 | 0.65 | 1.3 | 6 | 18 |
| 23 | 74 | 43 | 1.8 | 2.7 | 6.4 | 20 |
| 24 | 74 | 46 | 4.1 | 6 | 13 | 35 |

[1]Siloxane-based defoamer Surfynol DF-58 (from Air Products and Chemicals. Inc.)
[2]pigment dispersant Tamol 1124 (from Dow)

Various exemplary embodiments of the disclosure include, but are not limited to:

Embodiment 1 provides a vapor retarding article, comprising
a building material substrate; and
a polymeric coating layer coated on the building material substrate, the polymeric coating layer being different from the building material substrate, the polymeric coating layer comprising an inorganic hydrophilic particulate filler dispersed in a continuous organic phase comprising a hydrophobic polymer, wherein the content of the filler is from about 30% to about 85% by weight of the polymeric coating layer.

Embodiment 2 provides the vapor retarding article of embodiment 1, configured to have a water vapor permeance of no more than about 1 Perm at 25% relative humidity, as tested by ASTM E96 at 23° C.

Embodiment 3 provides the vapor retarding article of embodiment 1 of embodiment 2, configured to have a water vapor permeance of at least about 5 Perms (e.g., at least about 8 Perms, at least about 12 Perms, at least about 15 Perms, or at least about 20 Perms) at 95% relative humidity, as tested by ASTM E96 at 23° C.

Embodiment 4 provides the vapor retarding article of any of embodiments 1-3, configured to have a water vapor permeance of no more than about 6 Perms at 45% relative humidity (e.g., no more than about 4 Perms, or no more than about 2.5 Perms), as tested by ASTM E96 at 23° C.

Embodiment 5 provides the vapor retarding article of any of embodiments 1-4, configured to have a water vapor permeance in the range of about 5 Perms to about 18 Perms (e.g., about 5 Perms to about 12 Perms) at 75% relative humidity, as tested by ASTM E96 at 23° C.

Embodiment 6 provides the vapor retarding article of any of embodiments 1-5, wherein the building material substrate is porous.

Embodiment 7 provides the vapor retarding article of any of embodiments 1-6, wherein the building material substrate is a building material substrate sheet.

Embodiment 8 provides the vapor retarding article of embodiment 7, wherein the building material substrate sheet is paper, such as kraft paper.

Embodiment 9 provides the vapor retarding article of embodiment 7, wherein the building material substrate sheet is a scrim.

Embodiment 10 provides the vapor retarding article of embodiment 7, wherein the building material sheet is a non-woven fabric, such as a polypropylene non-woven fabric, a nylon non-woven fabric, a polyester non-woven fabric (e.g., a polyethylene terephthalate) non-woven fabric), a polystyrene non-woven fabric, an acrylonitrile/butadiene/styrene copolymer non-woven fabric, or a polyethylene non-woven fabric.

Embodiment 11 provides the vapor retarding article of embodiment 7, wherein the building material substrate sheet is a perforated thermoplastic film, e.g., a perforated polypropylene film, a perforated nylon film, a perforated polystyrene film, a perforated acrylonitrile/butadiene/styrene copolymer film, a perforated polyester film such as a perforated polyethylene terephthalate) film, or a perforated polyethylene film.

Embodiment 12 provides the vapor retarding article of any of embodiments 1-11, wherein the hydrophobic polymer is a styrene butadiene copolymer (e.g., a styrene butadiene rubber), an acrylic polymer or copolymer such as a styrene acrylic polymer, a vinyl acetate/ethylene copolymer, a poly(vinyl butyral), a poly(vinylidene chloride) polymer or copolymer, a polyvinyl chloride, a polyvinyl butyral, or a polyolefin (such as a polyethylene, a polypropylene, or a polybutadiene), or a combination thereof.

Embodiment 13 provides the vapor retarding article of any of embodiments 1-11, wherein the hydrophobic polymer is a styrene butadiene copolymer (e.g., a styrene butadiene rubber), an acrylic polymer or copolymer such as a styrene acrylic polymer, a vinyl acetate/ethylene copolymer, a poly (vinyl butyral), a poly(vinylidene chloride) polymer or copolymer, a polyvinyl chloride, a polyvinyl butyral, or a combination thereof.

Embodiment 14 provides the vapor retarding article of any of embodiments 1-12, wherein the hydrophobic polymer is coated onto the building material substrate from an aqueous dispersion of the hydrophobic polymer dispersed in water, such as a polymer latex, or from an aqueous emulsion of the hydrophobic polymer.

Embodiment 15 provides the vapor retarding article of any of embodiments 1-13, wherein the hydrophobic polymer is a styrene butadiene rubber (e.g., coated from a latex) or a styrene acrylic polymer (e.g., coated from a latex).

Embodiment 16 provides the vapor retarding article of any of embodiments 1-15, wherein the hydrophobic polymer is present in the continuous organic phase of the polymeric coating layer in an amount of at least about 70 wt %, or at least about 85 wt %, or at least 95% based on the total weight of the continuous organic phase of the polymeric coating layer.

Embodiment 17 provides the vapor retarding article of any of embodiments 1-15, wherein the hydrophobic polymer is present in the continuous organic phase layer in an amount of about 15 wt % to about 90 wt %, or about 15 wt % to about 80 wt %, or about 15 wt % to about 65 wt %, or about 15 wt % to about 50 wt %, or about 15 wt % to about 35 wt %, or about 25 wt % to about 90 wt %, or about 25 wt % to about 80 wt %, or about 25 wt % to about 65 wt %, or about 25 wt % to about 50 wt %, or about 40 wt % to about 90 wt %, or about 30 wt % to about 90 wt %, or about 30 wt % to about 80 wt %, or about 30 wt % to about 65 wt %, or about 30 wt % to about 50 wt %, or about 40 wt % to about 90 wt %, or about 40 wt % to about 80 wt %, or about 40 wt % to about 65 wt %, or about 55 wt % to about 90 wt %, or about 55 wt % to about 80 wt %, or about 70 wt % to about 90 wt %, based on the total weight of the polymeric coating layer.

Embodiment 18 provides the vapor retarding article of any of embodiments 1-17, wherein the particulate filler has a median particle size (i.e., d50, $50^{th}$ percentile particle size) of about 2 to about 10 µm.

Embodiment 19 provides the vapor retarding article of any of embodiments 1-17, wherein the particulate filler has a d10 and a d90 value (i.e., $10^{th}$ percentile particle size and $90^{th}$ percentile particle size) within the range of about 0.3 to about 30 µm.

Embodiment 20 provides the vapor retarding article of any of embodiments 1-19, wherein the particulate filler is alumina trihydrate, kaolin, or a mixture thereof.

Embodiment 21 provides the vapor retarding article of any of embodiments 1-19, wherein the particulate filler is kaolin.

Embodiment 22 provides the vapor retarding article of any of embodiments 1-19, wherein the particulate filler is alumina trihydrate.

Embodiment 23 provides the vapor retarding article of any of embodiments 1-17, wherein the particulate filler is alumina trihydrate, kaolin, graphite (e.g., nonexpendable graphite), calcium carbonate, barium sulfate, talc; calcium sulfate, sodium sulfate, silica, magnesium hydroxide, magnesium carbonate, antimony trioxide, clay, zinc borate, zinc oxide, zinc hydroxystannate, boehmite; aluminum diethyl phosphinate, ammonium polyphosphate, ammonium phosphate, mica, carbon black, montmorillonite, bentonite, muscovite; illite, cookeite, chlorite, diatomaceous earth, titania, or a combination thereof.

Embodiment 24 provides the vapor retarding article of any of embodiments 1-23, wherein the particulate filler is present in the polymeric coating layer in an amount of at least about 35 wt %, or at least about 40 wt %, or at least about 45 wt %, or at least about 50 wt %, or in the range of about 35 wt % to about 85 wt %, or about 50 wt % to about 85 wt %, or about 60 wt % to about 85 wt %, or about 30 wt % to about 80 wt %, or about 35 wt % to about 80 wt %, or about 50 wt % to about 80 wt %, or about 60 wt % to about 80 wt %, or about 30 wt % to about 75 wt %, or about 50 wt % to about 75 wt %, or about 60 wt % to about 75 wt %, or about 30 wt % to about 70 wt %, or about 50 wt % to about 70 wt %, or about 60 wt % to about 70 wt % based on the total dry weight of the polymeric coating layer.

Embodiment 25 provides the vapor retarding article of any of embodiments 1-23, wherein the particulate filler is present in the polymeric coating layer in an amount of at least 54 wt %, or in the range of 54 wt % to about 85 wt %, or 54 wt % to about 80 wt %, or 54 wt % to about 75 wt %, or 54 wt % to about 70 wt %, based on the total d eight of the polymeric coating layer.

Embodiment 26 provides the vapor retarding article of any of embodiments 1-25, wherein the combined content of the particulate filler and the hydrophobic polymer is at least about 80% by weight of the polymeric coating layer, e.g., at least about 85 wt %, or at least about 90 wt %, or at least about 95 wt %, or at least about 97 wt %, or at least about 98 wt %, or at least about 99 wt %, or about 100 wt % of the polymeric coating layer.

Embodiment 27 provides the vapor retarding article of any of embodiments 1-25, wherein the hydrophobic polymer is present in the polymeric coating layer in an amount of about 15 wt % to about 70 wt %, or about 15 wt % to about 65 wt %, or about 15 wt % to about 50 wt %, or about 15 wt % to about 35 wt %, about 25 wt % to about 70 wt %, or about 25 wt % to about 65 wt %, or about 25 wt % to about 50 wt %, or about 30 wt %, to about 70 wt %, or about 30 wt % to about 65 wt %, or about 30 wt % to about 50 wt %, or about 40 wt % to about 70 wt %, or about 40 wt % to about 65 wt %, or about 55 wt % to about 70 wt %.

Embodiment 28 provides the vapor retarding article of any of embodiments 1-27, wherein the continuous organic phase further includes a lower molecular weight less than 10 kDa) organic material, such as a wax or a low molecular weight polymer, in an amount up to 15 wt %, up to 10 wt % or up to 5 wt % of the continuous organic phase.

Embodiment 29 provides the vapor retarding article of any of embodiments 1-28, wherein the continuous organic phase further includes a polymeric hydrophilic component in an amount up to about 30 wt,%, e.g., in an amount up to 20 wt %, or up to 10 wt %, or in the range of 0.1 wt % to 30 wt %, or 0.1 wt % to 20 wt %, or 0.1 wt % to 1 wt %, or 1 wt % to 30 wt %, or 1 wt % to 20 wt %, or 1 wt % to 10 wt %, or 4 wt % to 30 wt %, or 4 wt % to 20 wt %, or 4 wt % to 10 wt % of the continuous organic phase.

Embodiment 30 provides the vapor retarding article of embodiment 29, wherein the continuous organic phase comprises less than about 4 wt %, or less than about 3 wt %, or less than about 2 wt %, or less than about 1 wt %, or less than about 0.5 wt %, or less than about 0.1 wt %, or is essentially free of polymeric hydrophilic components.

Embodiment 31 provides the vapor retarding article of any of embodiments 1-30, wherein the polymeric coating layer has a coat weight of at least about 10 g/m², for example, at least about 20 g/m², or even at least about 40 g/m².

Embodiment 32 provides the vapor retarding article of any of embodiments 1-31, wherein the polymeric coating layer has a coat weight of no greater than about 1000 g/m², or even no greater than about 500 g/m².

Embodiment 33 provides the vapor retarding article of any of embodiments 1-32, wherein the polymeric coating layer is partly embedded within the building material substrate; or wherein the coating layer is embedded within the building material substrate by about 5% to about 50% of the thickness of the polymeric coating layer.

Embodiment 34 provides the vapor retarding article of any of embodiments 1-33, wherein the polymeric coating layer and the building material substrate make up at least 80%, at least 90%, or even at least 99% of the thickness of the vapor retarding article.

Embodiment 35 provides the vapor retarding article of any of embodiments 1-34 having a nail tear resistance of at least about 10 N/5 cm as measured according to EIN 12310-1.

Embodiment 36 provides the vapor retarding article of any of embodiments 1-35, wherein e vapor retarding article is in the form of a vapor retarding membrane.

Embodiment 37 provides a method for making a vapor retarding article of any of embodiments 1-36, the method comprising
  providing a building material substrate; and
  coating a polymeric coating layer onto the building material substrate, the polymeric coating layer being different from the building material substrate, the polymeric coating layer comprising an inorganic hydrophilic particulate filler dispersed in a continuous organic phase comprising a hydrophobic polymer, wherein the content of the filler is from about 30% to about 85% by weight of the polymeric coating layer.

Embodiment 38 provides the method of embodiment 37, wherein coating the polymeric coating layer onto the substrate sheet includes providing a coating liquid comprising the hydrophobic polymer dispersed in a volatile liquid; coating the coating liquid onto the building material substrate; and allowing the coated liquid to cure by drying to provide the polymeric coating layer.

Embodiment 39 provides the method of embodiment 38, wherein the coating liquid is coated onto the substrate sheet by rolling (e.g., forward roll, reverse roll), roll to roll coating, slot die coating, mayer rod coating, knife coating, indirect gravure coating, or spraying.

Embodiment 40 provides the method of embodiment any of embodiments 37-39, wherein the volatile liquid is water.

Embodiment 41 provides the method of any of embodiments 37-40, wherein the hydrophobic polymer is present in the coating liquid in the form of a polymer dispersion (e.g., a polymer latex).

Embodiment 42 provides the method of any of embodiments 37-40 wherein the hydrophobic polymer is present in the coating liquid in the form of a polymer emulsion.

Embodiment 43 provides a vapor retarding article, comprising
  a building material substrate; and
  a polymeric coating layer coated on the building material substrate, the polymeric coating layer being different from the building material substrate, the polymeric coating layer comprising an inorganic hydrophilic particulate filler dispersed in a continuous organic phase comprising a hydrophobic polymer, wherein the content of the filler is from about 30% to about 85% by weight of the polymeric coating layer.

Embodiment 44 provides the vapor retarding article of embodiment 43, configured to have a water vapor permeance of no more than about 1 Perm (e.g., from about 0.1 Perm to about 1 Perm) at 25% relative humidity, as tested by ASTM E96 at 23° C.

Embodiment 45 provides the method of embodiment 43 or embodiment 44, wherein the vapor retarding article is configured to have a water vapor permeability of at least about 5 Perms (e.g., at least about 8 Perms, or at least about 12 Perms, or at least about 15 Perms, or at least about 20 Perms) at 95% relative humidity as tested by ASTM E96 at 23° C.

Embodiment 46 provides the vapor retarding article of any of embodiments 43-45, wherein the building material substrate is a building material substrate sheet, and wherein the vapor retarding article is in the form of a vapor retarding membrane.

Embodiment 47 provides the vapor retarding article of embodiment 46, wherein the building material substrate sheet is paper, such as kraft paper, a scrim, a non-woven fabric, such as a polypropylene non-woven fabric, a nylon non-woven fabric, a polyester non-woven fabric (e.g., a poly(ethylene terephthalate) non-woven fabric), a polystyrene non-woven fabric, an acrylonitrile/butadiene/styrene copolymer non-woven fabric, or a polyethylene non-woven fabric, or a perforated thermoplastic film, e.g., a perforated polypropylene film, a perforated nylon film, a perforated polystyrene film, a perforated acrylonitrile/butadiene/styrene copolymer film, a perforated polyester film such as a perforated poly(ethylene terephthalate) film, or a perforated polyethylene film.

Embodiment 48 provides the vapor retarding article of any of embodiments 43-47, wherein the hydrophobic polymer is a styrene butadiene copolymer (e.g., a styrene butadiene rubber), an acrylic polymer or copolymer such as a styrene acrylic polymer, a vinyl acetate/ethylene copolymer, a poly(vinyl butyral), a poly(vinylidene chloride) polymer or copolymer, or a polyolefin (such as polyethylene, polypropylene, or polybutadiene), or a combination thereof.

Embodiment 49 provides the vapor retarding article of any of embodiments 43-48, wherein the hydrophobic polymer is coated onto the substrate from an aqueous dispersion of the hydrophobic polymer dispersed in water, such as a polymer latex, or from an aqueous emulsion of the hydrophobic polymer.

Embodiment 50 provides the vapor retarding article of any of embodiments 43-49, wherein the hydrophobic polymer is present in the continuous organic phase of the polymeric coating layer in an amount of at least about 70 wt %, or at least about 85 wt %, based on the total weight of the continuous organic phase of the polymeric coating layer.

Embodiment 51 provides the vapor retarding article of any of embodiments 43-50, wherein the particulate filler has a median particle size (i.e., d50, 50$^{th}$ percentile particle size) of about 2 to about 10 μm.

Embodiment 52 provides the vapor retarding article of any of embodiments 43-51, wherein the particulate filler is alumina trihydrate, kaolin, or a mixture thereof.

Embodiment 53 provides the vapor retarding article of any of embodiments 43-51, wherein the particulate filler is alumina trihydrate.

Embodiment 54 provides the vapor retarding article of any of embodiments 43-53, wherein the particulate filler is present in the polymeric coating layer in an amount of at least 54 wt %, or comprised in the range of 54 wt % to about 85 wt %, or 54 wt % to about 80 wt %, or 54 wt % to about 75 wt %, or 54 wt % to about 70 wt %, based on the total dry weight of the polymeric coating layer.

Embodiment 55 provides the vapor retarding article of any of embodiments 43-54, wherein the combined content of the particulate filler and the hydrophobic polymer is at least about 80% by weight of the polymeric coating layer, e.g., at least about 85 wt %, or at least about 90 wt %, or at least about 95 wt %, or at least about 97 wt %, or at least about 98 wt %; or at least about 99 wt %, or about 100 wt % of the polymeric coating layer.

Embodiment 56 provides the vapor retarding article of any of embodiments 43-55, wherein the continuous organic phase comprises less than about 4 wt %, or less than about 3 wt %, or less than about 2 wt %, or less than about 1 wt %, or less than about 0.5 wt %, or less than about 0.1 wt %, or is essentially free of polymeric hydrophilic components.

Embodiment 57 provides a method for making a vapor retarding article of any of embodiments 43-56, the method comprising
providing a building material substrate; and
coating a polymeric coating layer onto the building material substrate, the polymeric coating layer being different from the building material substrate, the polymeric coating layer comprising an inorganic hydrophilic particulate filler dispersed in a continuous organic phase comprising a hydrophobic polymer, wherein the content of the filler is from about 30% to about 85% by weight of the polymeric coating layer.

Embodiment 58 provides the method of embodiment 57, wherein coating the polymeric coating layer onto the substrate sheet includes providing a coating liquid comprising the hydrophobic polymer dispersed in a volatile liquid (e.g., water); coating the coating liquid onto the building material substrate (e.g., by rolling or spraying); and allowing the coated liquid to cure by drying to provide the polymeric coating layer.

Embodiment 59 provides the method of embodiment 57 or embodiment 58, wherein the hydrophobic polymer is present in the coating liquid in the form of a polymer dispersion (e.g., a polymer latex) or a polymer emulsion.

It is understood that the examples and embodiments described herein are for illustrative purposes only and that various modifications or changes in light thereof will be suggested to persons skilled in the art and are to be incorporated within the spirit and purview of this application and scope of the appended claims. All publications, patents, and patent applications cited herein are hereby incorporated herein by reference for all purposes.

We claim:

1. A vapor retarding membrane, comprising
a building material substrate sheet, the building material substrate sheet being a sheet of paper or fabric; and
a polymeric coating layer coated on the building material substrate sheet, the polymeric coating layer being different from the building material substrate sheet, the polymeric coating layer comprising an inorganic hydrophilic particulate filler comprising kaolin, the inorganic hydrophilic particulate filler being dispersed in a continuous organic phase comprising a hydrophobic polymer comprising a styrene butadiene copolymer, a styrene acrylic copolymer, or a poly(vinylidene dichloride) polymer, wherein the content of the particulate filler is from about 35% to about 85% by weight of the polymeric coating layer, and wherein the combined content of the particulate filler and the hydrophobic polymer is at least about 90% by weight of the polymeric coating layer;
wherein the vapor retarding membrane is configured to have a water vapor permeance of no more than about 1 Perm at 25% relative humidity,
in the range of about 0.3 to about 6 Perms at 45% relative humidity,
in the range of about 5 to about 12 Perms at 75% relative humidity, and
at least about 8 Perms at 95% relative humidity,
as tested by ASTM E96 at 23° C.

2. The vapor retarding membrane of claim 1, wherein the building material substrate sheet is paper.

3. The vapor retarding membrane of claim 1, wherein the hydrophobic polymer is a styrene butadiene copolymer.

4. The vapor retarding membrane of claim 1, wherein the hydrophobic polymer is coated onto the substrate sheet from an aqueous dispersion of the hydrophobic polymer dispersed in water or from an aqueous emulsion of the hydrophobic polymer.

5. The vapor retarding membrane of claim 1, wherein the hydrophobic polymer is present in the continuous organic phase of the polymeric coating layer in an amount of at least about 70 wt %, based on the total weight of the continuous organic phase of the polymeric coating layer.

6. The vapor retarding membrane of claim 1, wherein the particulate filler has a median particle size of about 2 to about 10 μm.

7. The vapor retarding membrane of claim 1, wherein the particulate filler further comprises alumina trihydrate.

8. The vapor retarding membrane of claim 1, wherein the particulate filler is present in the polymeric coating layer in an amount of at least 54 wt %, based on the total dry weight of the polymeric coating layer.

9. The vapor retarding membrane of claim 1, wherein the continuous organic phase further comprises a lower molecular weight organic material in an amount up to 15 wt % of the continuous organic phase.

10. The vapor retarding membrane of claim 1, wherein the continuous organic phase has an amount of polymeric hydrophilic components that is less than 0.5 wt %.

11. The vapor retarding membrane of claim 1, wherein the polymeric coating layer has a coat weight of at least about 10 g/m$^2$.

12. A method for making a vapor retarding membrane of claim 1, the method comprising
providing the building material substrate sheet; and
coating the polymeric coating layer onto the building material substrate sheet, the polymeric coating layer being different from the building material substrate sheet.

13. The method of claim 12, wherein coating the polymeric coating layer onto the substrate sheet includes providing a coating liquid comprising the hydrophobic polymer dispersed in a volatile aqueous liquid; coating the coating liquid onto the building material substrate sheet; and allowing the coated liquid to cure by drying to provide the polymeric coating layer.

14. The method of claim 13, wherein the hydrophobic polymer is present in the coating liquid in the form of a polymer dispersion or a polymer emulsion in water.

15. The vapor retarding membrane of claim 1, wherein the combined content of the particulate filler and the hydrophobic polymer is at least about 97.5% by weight of the polymeric coating layer.

16. The vapor retarding membrane of claim 1, wherein the building material substrate sheet is a non-woven fabric.

17. The vapor retarding membrane of claim 1, wherein the hydrophobic polymer is a styrene-butadiene copolymer and the hydrophobic filler is kaolin alone.

18. The vapor retarding membrane of claim 1, wherein the hydrophobic polymer is a styrene-butadiene copolymer and the particulate filler is aluminum trihydrate in combination with kaolin.

19. The vapor retarding membrane of claim 1, wherein the hydrophobic polymer is a styrene-acrylic copolymer.

\* \* \* \* \*